United States Patent [19]

Ando et al.

[11] 4,122,117
[45] Oct. 24, 1978

[54] INDANDIONE BIS-AZOMETHINE PIGMENTS

[75] Inventors: Hirohito Ando, Hazaki; Kouichi Takagi, Nishinomiya; Masao Shukuya, Hazaki, all of Japan

[73] Assignee: Dainippon Ink & Chemicals, Inc., Tokyo, Japan

[21] Appl. No.: 760,389

[22] Filed: Jan. 18, 1977

[51] Int. Cl.$^2$ .................. C09B 55/00; C07C 119/06; C07D 239/72; C07D 283/02
[52] U.S. Cl. ................................. 260/566 R; 542/420
[58] Field of Search ............ 260/566 R, 562 P, 558 P, 260/559 R, 429 C; 106/288 Q; 560/35

[56] References Cited

PUBLICATIONS

Gudriniece et al., Chem. Abst. 78 (1973), No. 110986.
Gudriniece et al., Chem. Abst. 80 (1974), No. 27015.
Ozolt et al., Chem. Abst. 77 (1972), No. 88122.
Belevich et al., Chem. Abst. 78 (1973), No. 135921.
Ando et al., Chem. Abst. 83 (1975), No. 44726.
Ando et al., Chem. Abst. 84 (1976), No. 166238.
Takaki et al., Chem. Abst. 85 (1976), No. 34622.
Belevich et al., Chem. Abst. 81 (1974), No. 37506.

*Primary Examiner*—Allen B. Curtis
*Attorney, Agent, or Firm*—Sherman & Shalloway

[57] ABSTRACT

An indandione pigment having high tinting strength and good weatherability and light fastness of the formula

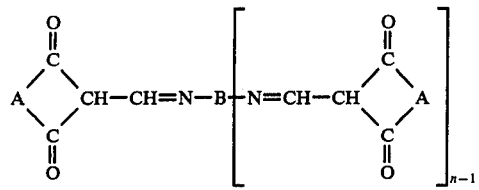

wherein A is a phenylene or naphthylene group optionally substituted by a halogen atom, a lower alkyl group, a lower alkoxy group or a nitro group; $n$ is 2 or 1; and B represents a direct bond or an $n$ valont aromatic radical.

The pigment mentioned above can be prepared by reacting an indandione derivative of the formula

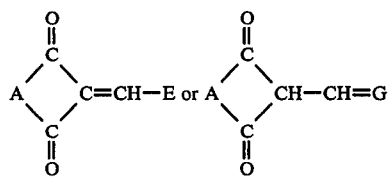

(E is an alkoxy group with 1 to 3 carbon atoms, or an amino group; and G is an oxygen atom, or

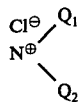

in which $Q_1$ is a lower alkyl group, and $Q_2$ is a lower alkyl group or a phenyl group) with an amino compound of the formula $H_2N-B-[NH_2]n-1$.

5 Claims, No Drawings

INDANDIONE BIS-AZOMETHINE PIGMENTS

This invention relates to novel azomethine pigments. More specifically, the invention relates to indandione pigments of the following formula containing 1 or 2 azomethine groups (—CH=N—), and a process for their production.

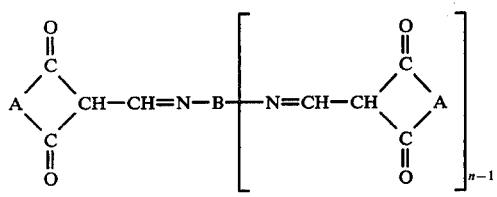

In formula (I), A is a phenylene or naphthylene group optionally substituted by a halogen atom, a lower alkyl group, a lower alkoxy group, or a nitro group; n is 1 or 2; and B represents a direct bond, or an n valent aromatic radical.

According to a preferred embodiment of this invention, the indandione pigments are expressed by formula (I) in which A is

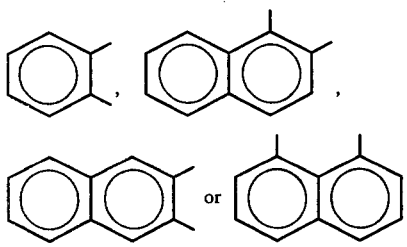

which is optionally substituted by 1 to 4 halogen atoms, lower alkyl groups, lower alkoxy groups or nitro groups; n is 2 or 1; and B represents a direct bond (a hydrazine residue), or an aromatic radical selected from (a) to (f) below:

(a) a phenyl group containing —CONHR$_1$, —NH-COR$_2$, —SO$_2$NR$_3$R$_4$, or

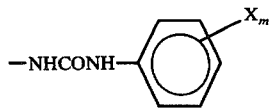

which phenyl group may be substituted by a lower alkyl group, a lower alkoxy group, or a halogen atom, wherein R$_1$ is a phenyl, benzimidazolone, 2,4-dihydroxyquinazoline, carbazole or acridone group; R$_2$ is a lower alkyl, phenyl or phthalimido group; R$_3$ is a hydrogen atom, or a lower alkyl group; R$_4$ is a hydrogen atom, a lower alkyl group, or a phenyl group; X is a halogen atom; and m is 0 or an integer of 1 to 4; the phenyl group represented by R$_1$, R$_2$ or R$_4$ may be substituted by a lower alkyl group, a lower alkoxy group, a halogen atom, a phthalimido group, a halophthalimido group, an acetylamino group, or a benzoylamino group;

(b) a phenylene group optionally substituted by a lower alkyl group, a lower alkoxy group, a halogen atom, an acetylamino group, or a benzoylamino group;

(c) the group

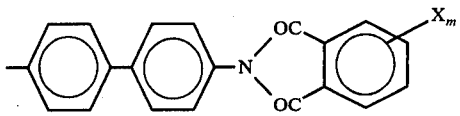

(wherein X and m are as defined above) optionally substituted by a lower alkyl group, a lower alkoxy group, a lower alkoxycarbonyl group, or a halogen atom;

(d) the group

optionally substituted by a lower alkyl group, a lower alkoxycarbonyl group, or a halogen atom;

(e) the group

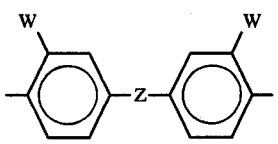

wherein W is a hydrogen atom, a halogen atom, a lower alkyl group, or a lower alkoxy group; Z is a bond selected from —O—, —S—, —NH—, —N=N—, —NHCO—, —CH=CH—, —CH$_2$—, —NHCONH—, and

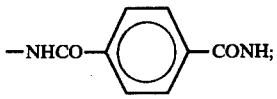

and (f) a pyridine ring group, or a bi- or triheterocyclic group having a nitrogen-containing 5- or 6-membered ring fused to a benzene ring.

An especially preferred group of indandione pigments of this invention is expressed by formula (I) in which A is

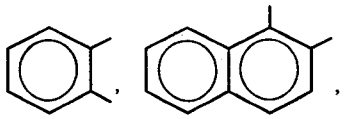

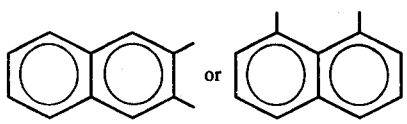

optionally substituted by 1 to 4 halogen atoms, or 1 to 2 lower alkyl, lower alkoxy or nitro groups, the total number of substituents being not in excess of 4 when the aromatic ring is substituted by more than 2 substituents; n is 2 or 1; and B represents a direct bond, or an aromatic radical selected from the group of (a') to (f') below:

(a') the group

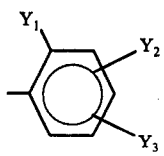

wherein $Y_1$ is a hydrogen atom, a lower alkyl group, or a lower alkoxy group; $Y_2$ is $-CONHR_1$, $-NHCOR_2$, $-SO_2NR_3R_4$, or

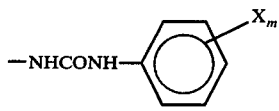

in which $R_1$, $R_2$, $R_3$, $R_4$, X and m are as defined hereinabove; and $Y_3$ is a hydrogen atom, a lower alkyl group, a lower alkoxy group, or a halogen atom;

(b') a 1,2-phenylene group, a 1,3-phenylene group optionally substituted at the 2-, 4-, or 4,6-positions; or a 1,4-phenylene group optionally substituted at the 2-, 2,5-, or 2,6-positions; (the substituents being lower alkyl groups, lower alkoxy groups, halogen atoms, acetylamino groups, or a benzoylamino groups);

(c') the group

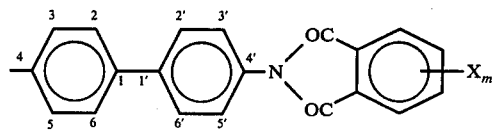

optionally substituted at the 2,2'—, 3,3'—, or 2,2'—5,5'— positions by lower alkyl groups, lower alkoxy groups, lower alkoxycarbonyl groups or halogen atoms, wherein X and m are as defined hereinabove;

(d') the group

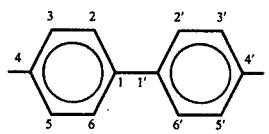

optionally substituted at the 2,2'—, 3,3'—, or 2,2'—5,5'- positions by lower alkyl groups, lower alkoxycarbonyl groups, or halogen atoms;

(e') the group

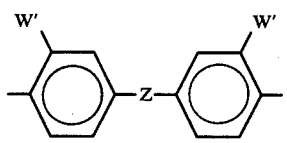

wherein
W' is a hydrogen atom, a lower alkyl group, or a lower alkoxy group, and Z is as defined above; and (f') a heterocyclic group of the following structure:

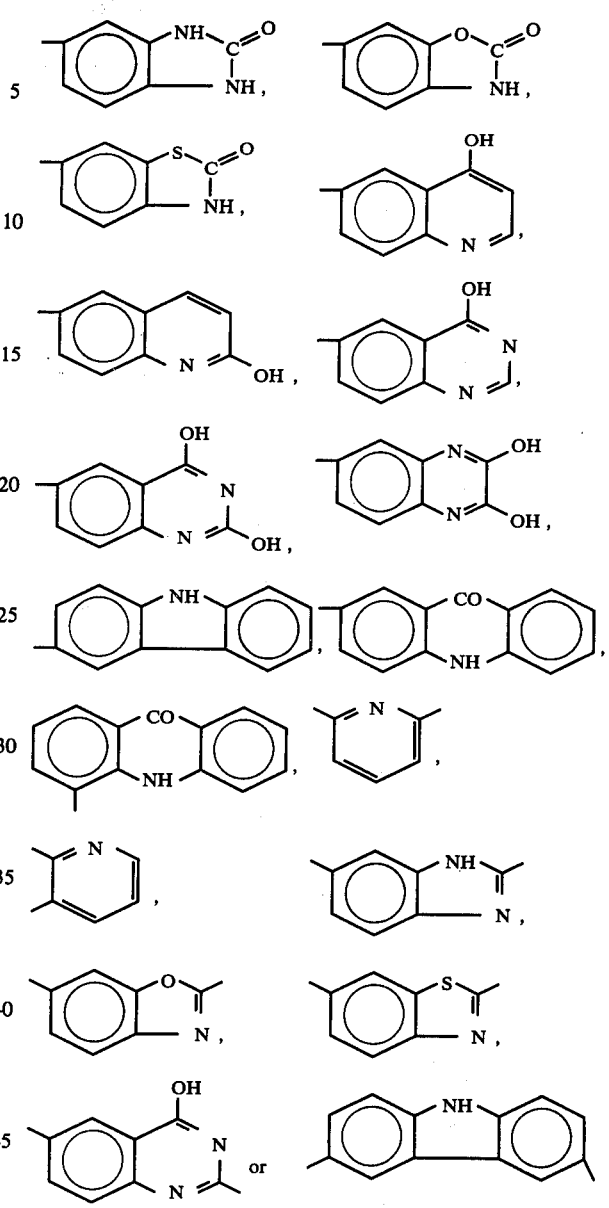

which is optionally substituted by a lower alkyl group, a lower alkoxy group, a phenyl group, or a phenylene group.

It should be understood that in the present specification and claims, the lower alkyl group denotes methyl and ethyl groups; the lower alkoxy group, methoxy and ethoxy groups; the lower alkoxycarbonyl group, methoxycarbonyl and ethoxycarbonyl groups; and the halogen atom, chlorine, bromine and fluorine.

The novel indandione pigments of formula (I) are produced by reacting indandione derivatives of the formula

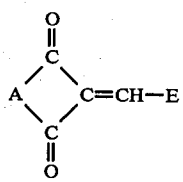

(II)

or

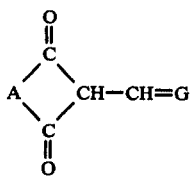 (III)

wherein A is the same as defined with regard to formula (I); E is an alkoxy group with 1 to 3 carbon atoms, or an amino group; G represents an oxygen atom, or

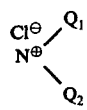

in which $Q_1$ is a lower alkyl group and $Q_2$ is a lower alkyl group or a phenyl group, with amino compounds of the following formula

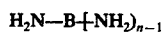 (IV)

wherein B and n are as defined above with regard to formula (I).

The condensation reaction between the indandione derivative and the amino compound is carried out in an inert solvent at a temperature of 0° to 150° C., preferably 20° to 140° C. Usually, such a condensation reaction does not require catalysts. But when G in formula (III) for the indandione derivative represents

the use of a basic catalyst, for example, an alkali metal acetate such as sodium acetate or potassium acetate, an alkali metal hydroxide such as sodium hydroxide or potassium hydroxide, or an alkali metal alcoholate such as sodium methylate proves effective.

Suitable inert solvents used in the above reaction are organic solvents, for example, alcohols such as methanol, ethanol, ethylene glycol or propylene glycol, aromatic hydrocarbons or their halogenated products such as toluene, xylene, monochlorobenzene, dichlorobenzene, trichlorobenzene or nitrobenzene, esters such as methyl acetate or ethyl acetate, acetic acid, N,N-dimethylformamide, dimethyl sulfoxide, N-methylpyrrolidione, and N,N-dimethylacetamide. Water can also be used as a satisfactory solvent in the reaction of the indandione derivative (III) in which G denotes an oxygen atom, with the amino compound (IV). Of the above inert solvents, N,N-dimethylformamide is especially useful since it allows the condensation reaction to proceed smoothly.

The amount of the indandione derivative (II) or (III) depends upon the numeral n in the amino compound (IV). Theoretically, the amount of the indandione derivative is 1 mole per mole of the amino compound when n is 1 (that is, when a monoamino compound is used), and is 2 moles per mole of the amino compound when n is 2 (that is, when a diamino compound is used). Advantageously, the indandione derivative is used in an amount exceeding the stoichiometrical amount of the amino compound by 10 to 50%.

The production of the indandione derivative (II) or (III) starts from an indandione compound of the following formula

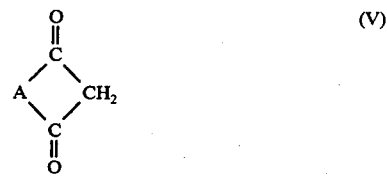 (V)

wherein A is as defined with regard to formula (I).

The indandione derivative of formula (II) is a compound produced according to the new finding of the present inventors. An indandione derivative of formula (II) in which E is an alkoxy group with 1 to 3 carbon atoms is obtained by reacting the indandione compound of formula (V) with an alkyl orthoformate such as methyl orthoformate, ethyl orthoformate or propyl orthoformate in an inert solvent of the type described hereinabove at a temperature of at least 0° C. advantageously 20° to 120° C. An indandione derivative of formula (II) in which E is an amino group is obtained by reacting the indandione compound (V) with formamide in an inert solvent at a temperature of at least 80° C., advantageously 120° to 150° C.

On the other hand, the indandione derivative of formula (III) is produced by known methods. An indandione derivative of formula (III) in which G is

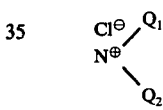

is obtained by reacting the indandione compound of formula (V) with a known Vilsmeier reagent (i.e., a mixture of an N-formul compound, preferably N,N-dimethylformamide or N-formyl-N'-methylaniline, with an inorganic acid halide, preferably phosphorus oxychloride, thionyl chloride, or phosgene). An ndandione derivative of formula (III) in which G is an oxygen atom can be obtained by a known formulation reaction, for example, by hydrolyzing the reaction product formed between the indandione compound of formula (V) and the Vilsmeier reagent; or by blowing a gaseous mixture of carbon monoxide and hydrogen chloride into the indandione compound (V) in the presence of catalyst (The Gattermann-Koch reaction); or by causing hydrogen chloride and zinc cyanide to act on the indandione compound (V) (the Gattermann reaction).

Examples of suitable indandione compounds of formula (V) are indandione-(1,3), α,β-naphthoindandione, β,γ-naphthoindandione, peri-naphthoindandione, mononitroindandione-(1,3), monochloroindandione-(1,3), dichloroindandione-(1,3), dibromoindandione-(1,3), trichloroindandione-(1,3), tribromoindandione-(1,3), tetrachloroindandione-(1,3), tetrabromoindandione-(1,3), tetrafluoroindandione-(1,3), mononitronaphthoindandione, monomethoxynaphthoindandione, monochloronaphthoindandione, dichloronaphthoindandione, dibromonaphthoindandione, tetrachloronaphthoindandione, and tetrabromonaphthoindandione.

Examples of suitable amino compounds of formula (IV) include hydrazine, N-(3'-aminobenzoyl)-4-acetylaminoaniline, N-(3'-amino-6'-methoxy-benzoyl)-2,4-dichloroaniline, N-(3'-aminobenzoyl)-4-benzoylaminoaniline, N-(3'-aminobenzoyl) 4-phthalimidoaniline, N-(3'-amino-4'-methoxy-benzoyl)-2,5-dimethylaniline, N-(3'-amino-4'-methyl-benzoyl)-4-benzoylaminoaniline, N-(3'-amino-4'-methyl-benzoyl)-4-acetylaminoaniline, N-(3'-amino-4'-methoxy-benzoyl)-2,5-dichloroaniline, N-(3'-amino-4'-methoxy-benzoyl)-2,5-dimethoxy-4-chloroaniline, N-(3'-amino-4'-methoxy-benzoyl)-4-benzoylaminoaniline, N-(3'-amino-4'-ethoxy-benzoyl)-4-tetrachlorophthalimidoaniline, 4-(2',5'-dichlorobenzoylamino)aniline, 4-(4'-acetylaminobenzoylamino)aniline, 4-(4'-methyl-benzoylamino)-2-methylaniline, 4-(4'-benzoylamino-benzoylamino)-2,5-dimethylaniline, 2,4-dimethyl-5-acetylaminoaniline, 2,4-dimethyl-5-(4'-chlorobenzoylamino)aniline, 5-(4'-amino-2'-methylphenylcarbamoyl) phthalimide, 4-(2',5'-dichlorobenzoylamino)-2-methoxy-aniline, 5-phthalimido-2,4-dimethoxyaniline, 4-(4'-tetrachlorophthalimido-benzoylamino)-2,5-dimethoxy-aniline, 5-(4'-amino-2',5'-dimethoxyphenyl)carbamoyl phthalimide, 4-(4'-chlorobenzoylamino)-2,5-diethoxyaniline, 2,4-diethoxy-5-(4'-acetylamino-benzoylamino)aniline, 3-[N-(2',5'-dimethylphenyl)sulfamoyl]aniline, 2-methyl-5-sulfamoylaniline, 2-methoxy-5-(N,N-dimethylsulfamoyl)aniline, 2-methoxy-5-(N-methylsulfamoyl)aniline, 2-ethoxy-5-(N-phenylsulfamoyl)aniline, 2,4-diethoxy-5-sulfamoylaniline, 4-(N'-4'-methylphenylureido)aniline, 2-methyl-4-(N'-4'-chlorophenylureido)aniline, 2,5-dimethyl-4-(N'-phenylureido) aniline, 2-methoxy-4-(N'-phenylureido)aniline, 2,5-dimethoxy-4-(N'-2',5'-dichlorophenylureido)aniline, 2-ethoxy-4-(N'-4'-methoxyphenylureido)aniline, o-phenylenediamine, m-phenylenediamine, 2,4-diaminotoluene, 2,6-diaminotoluene, 2,4-diaminoanisidine, 2,4-diamino-1-chlorobenzene, 1-acetylamino-2,4-phenylenediamine, 1-benzoylamino-2,4-phenylenediamine, p-phenylenediamine, 2-chloro-1,4-phenylenediamine, 2-methyl-1,4-phenylenediamine, 2,5-dimethyl-1,4-phenylenediamine, 2,6-dimethyl-1,4-phenylenediamine, 2-methoxy-1,4-phenylenediamine, 2,5-dimethoxy-1,4-phenylenediamine, 2-ethoxy-1,4-phenylenediamine, 2-acetylamino-1,4-phenylenediamine, 2-benzoylamino-1,4-phenylenediamine, 4-amino-4'-tetrachlorophthalimido-3,3'-dimethyldiphenyl, 4-amino-4'-phthalimido-2,2'-dichlorodiphenyl, 4-amino-4'-tetrabromophthalimido-3,3'-dimethoxydiphenyl, 4-amino-4'-phthalimido-3,3'-diethoxycarbonyldiphenyl, 3,3'-dimethyl-4,4'-diaminodiphenyl, 3,3'-dimethoxycarbonyl-4,4'-diaminodiphenyl, 2,2'-dichloro-4,4'-diaminodiphenyl, 2,2',5,5'-tetramethyl-4,4'-diaminodiphenyl, 4,4'-diaminodiphenyl ether, 3,3'-dimethoxy-4,4'-diaminodiphenyl ether, 4,4'-diaminodiphenyl sulfide, 3,3'-dimethyl-4,4'-diaminodiphenyl sulfide, 4,4'-diaminoazobenzene, 4,4'-diaminostilbene, 4,4'-diaminodiphenylmethane, 3,3'-dimethoxy-4,4'-diaminodiphenylmethane, 2,2',5,5'-tetramethyl-4,4'-diaminodiphenylmethane, 4,4'-diaminodiphenylamine, 3,3'-dichloro-4,4'-diaminodiphenylamine, 4,4'-diaminobenzanilide, 4,4'-diamino-3,3'-dimethylbenzanilide, 4,4'-ureylenedianiline, terephthaloyl-4,4'-diaminoaniline, 5-aminobenzimidazolone, 5-amino-6-methoxybenzimidazolone, 6-aminobenzoxazolone, 6-aminobenzothiazolone, 4-hydroxy-6-aminoquinaldine, 2-hydroxy-6-aminoquinaldine, 2-methyl-4-hydroxy-6-aminoquinazoline, 2-phenyl-4-hydroxy-6-aminoquinazoline, 2,4-dihydroxy-6-aminoquinazoline, 2,3-dihydroxy-6-aminoquinoxaline, 3-aminocarbazole, 2-aminoacridone, 4-aminoacridone, 2,3-diaminopyridine, 2,6-diaminopyridine, 2,4-diamino-benzimidazole, 2,6-diaminobenzothiazole, 2,6-diaminobenzoxazole, 2-(4'-aminophenyl)-6-aminobenzoxazole, 2-(4'-aminophenyl)-6-amino-4-hydroxyquinazoline, and 3,6-diaminocarbazole.

As stated hereinabove, the indandione pigments of this invention are produced usually by reacting the isolated indandione derivatives (II) or (III) with the amino compounds (IV) in inert solvents. However, when an indandione derivative of formula (II) in which E is an alkoxy group with 1 to 3 carbon atoms is used as a starting material, the desired pigment of formula (I) can be prepared also by first reacting the alkyl orthoformate with the indandione compound (V) in an inert solvent, and adding the amino compound (IV) to the resulting reaction mixture.

Alternatively, when the alkyl orthoformate is used as a reacting material, the ester is first reacted with the amino compound (IV) in an inert solvent at a temperature of at least 20° C., advantageously 60° to 130° C. to form an amino derivative of the following formula

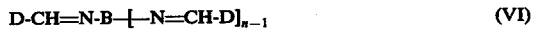
$$D-CH=N-B-[-N=CH-D]_{n-1} \qquad (VI)$$

wherein B and $n$ are as defined hereinabove with regard to formula (I), and D represents an alkoxy group with 1 to 3 carbon atoms, and then the resulting amino derivative (VI) is reacted with the indandione compound (V) at a temperature of 0° to 150° C., advantageously 20° to 140° C. to form the desired indandione pigment (I).

The indandione pigments of this invention have high tinting strength and are chemically stable, and in particular, have superior weatherability and light fastness. These pigments are suitable as exterior paints, inks, and coloring agents for synthetic resins.

The molecular structures of the pigments of this invention were assigned on the basis of the method of their synthesis and the study of their infrared spectra and in some cases, of their mass spectra, and confirmed by the correspondence between the calculated and found values in elementary analysis for representative examples.

The following Examples further illustrate the present invention. Unless otherwise specified, all parts are by weight.

EXAMPLE 1

31.3 Parts of 2-formyl-4,5,6,7-tetrachloroindandione-(1,3) and 6.1 parts of 2,5-dimethyl-1,4-phenylenediamine were suspended in 500 parts of N,N-dimethylformamide, and stirred at 100° C. for 2 hours. The suspension was filtered at 60° C. The filtration cake was washed with methanol and hot water in this order, and then dried to afford 30.5 parts of an orange pigment as a powder, which was found to have the following structure:

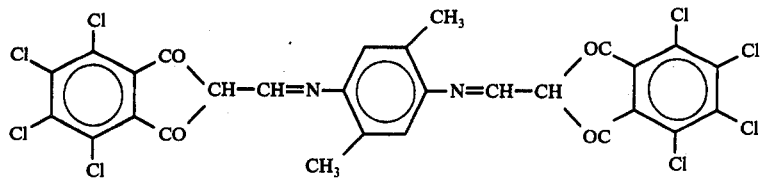

A dry color was prepared by mixing the resulting pigment and zinc stearate in a mixing ratio of 1:1. Then, 0.2 part of the resulting dry color was blended with 100 parts of polyethylene, and the mixture was extruded at a molding temperature of 200° C. for a residence time of 0 minutes, and then at a molding temperature of 250° C. for a residence time of 5 minutes. In both cases, a plate having a brilliant deep orange color was obtained. This shows that the pigment had good thermal stability. When the plates were exposed for 500 hours to a Sunshine Weather-Ometer, no discoloration was observed. This means that the pigment had good weatherability.

EXAMPLE 2

2.5 Parts of 2,2'-dichloro-4,4'-diaminodiphenyl and 5.0 parts of ethyl orthoformate were dissolved in 500 parts of glacial acetic acid, and 10.0 parts of 4,5,6,7-tetrabromoindandione-(1,3) was gradually added to the solution at 30° to 40° C. The mixture was heated under reflux for 2 hours, and then cooled and filtered. The filtration cake was washed with methanol and hot water in this order, and dried to afford 11.9 parts of a bluish dropwise at 20° to 30° C. The solution was heated to 60° C., and stirred at this temperature for 1 hour. Then, it was cooled, and filtered. The filtration cake was washed with N-N-dimethylformamide, methanol, and water in this order, and dried to afford 5.4 parts of a bluish yellow powder, which was found to have the following structure:

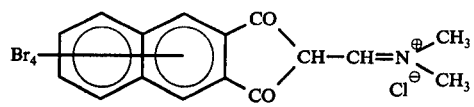

3.0 Parts of this product, 0.4 part of 4-aminobenzoyl-(4'-aminophenylamide), and 0.5 part of anhydrous sodium acetate were heated in 100 parts of o-dichlorobenzene with stirring at 120° C. for 4 hours, and the mixture filtered at 60° C. The filtration cake was washed with xylene, methanol, and hot water in this order, and dried to afford 2.4 parts of a reddish yellow pigment as a powder, which was found to have the following structure:

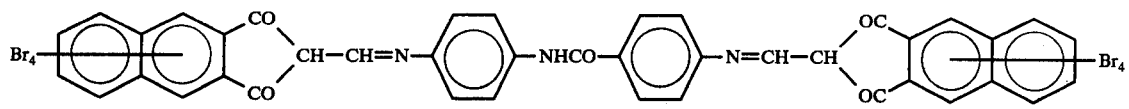

yellow pigment as a powder, which was found to have the following structure:

A printing ink obtained by kneading this pigment with a varnish had good printability, and gave a vivid

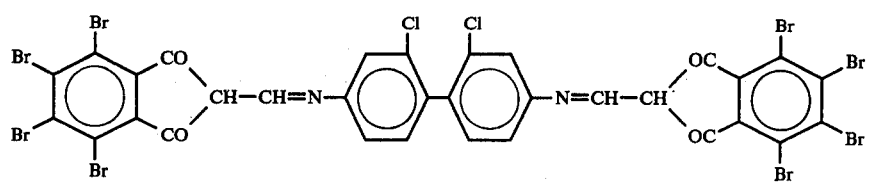

Even when this pigment was kneaded with polyvinyl chloride by a hot roll at 160° C. for 15 minutes, it did not undergo discoloration, but had good thermal stability.

A white sheet of polyvinyl chloride prepared by kneading the resin with titanium white was superposed on a bluish yellow sheet of polyvinyl chloride obtained by kneading the resin with the above pigment, and a migration test was conducted by applying at a pressure of 0.1 kg/cm² to the assembly for 1 hour. No migration was observed. Furthermore, no discoloration was observed in the bluish yellow sheet when it was exposed to a fade-ometer for 200 hours.

EXAMPLE 3

5.2 Parts of tetrabromo-5,6-benzoindandione-(1,3) was dissolved in 50 parts of N,N-dimethylformamide, and 1.8 parts of phosphorus oxychloride was added reddish yellow print on paper. When the print was exposed to a fade-ometer for 200 hours, no discoloration was observed.

EXAMPLE 4

26.5 Parts of 4,5-dichloro-1,8-malonyl naphthalene was gradually poured into 500 parts of N-methylpyrrolidone in which 15.0 parts of methyl orthoformate had been dissolved. The mixture was stirred at 25° to 30° C. for 30 minutes, and then 10.0 parts of 4,4'-diaminodiphenylamine was added. The mixture was stirred at 120° C. for 6 hours, and filtered at 60° C. The filtration residue was washed with methanol and hot water in this order, and then dried to afford 32.8 parts of a brown pigment as a powder, which was found to have the following structure.

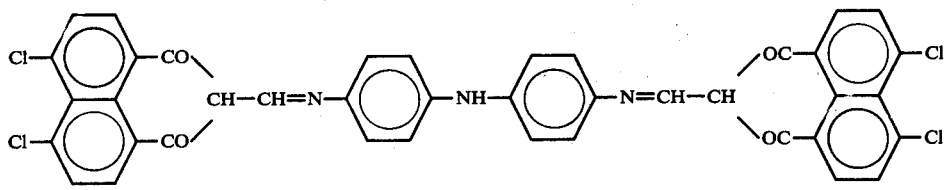

When a colored plate prepared from polystyrene colored brown with this pigment was exposed to a fade-ometer for 200 hours, no discoloration was observed.

EXAMPLE 5

23.0 Parts of 2-formyl-4-chloroindandione-(1,3) and 12.6 parts of 2-(4'-aminophenyl)-6-amino-4-hydroxyquinazoline were heated in 500 parts of ethylene glycol with stirring at 120° C. for 3 hours, and cooled to room temperature. The mixture was filtered, and the filtration cake was washed with methanol and hot water in this order, and then dried to afford 28.6 parts of a brilliant yellow pigment as a powder, which was found to have the following structure:

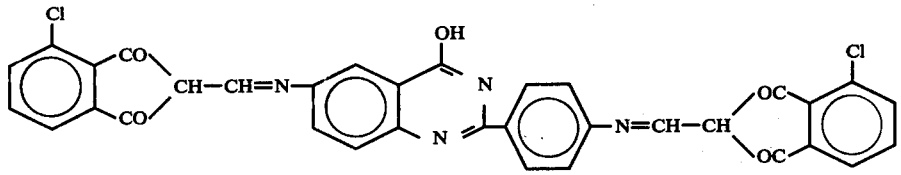

This pigment was kneaded with an aminoalkyd resin, and a thinner was added to prepare a paint. The paint was extended on a steel panel using an applicator, and baked at 130° C. for 20 minutes to afford a brilliant yellow coating. The resulting coating was overcoated with a white paint of a melaminealkyd resin, and the overcoat was baked at 160° C. for 30 minutes. No bleeding was observed.

Furthermore, this yellow pigment was diluted with 20 times its weight of titanium white, and kneaded with a melaminealkyd resin. The resulting melaminealkyl light-colored paint was extended on a steel panel by an applicator, and baked. The resulting coating had sufficient density, and no discoloration was observed even when it was exposed to a Sunshine Weather-Ometer for 500 hours.

EXAMPLE 6

21.0 Parts of 2-formyl-5-nitroindandione-(1,3) and 8.2 parts of 2,6-diaminobenzothiazole were stirred under reflux in 1.000 parts of ethyl acetate for 6 hours. The mixture was hot-filtered, and the filtration cake was washed with methanol and hot water in this order, and then dried to afford 25.4 parts of a yellow pigment as a powder, which was found to have the following structure:

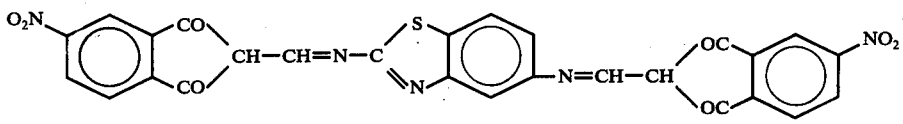

An ink obtained by kneading 1 part of this pigment with 1.6 parts of a varnish had good printability, and gave a brilliant yellow print on art paper. When this print was exposed to a fade-ometer for 200 hours, no discoloration was observed.

EXAMPLE 7

19.6 Parts of 4,5-benzoindandione-(1,3) was dispersed in 500 parts of xylene having dissolved therein 15.0 parts of N-formyl-N'-methylaniline, and then, 14.4 parts of thionyl chloride was gradually added dropwise at 20° to 30° C. The mixture was heated to 70° C., and stirred at this temperature for 2 hours. It was then cooled to 5° C., and filtered. The filtration cake was washed with petroleum benzine, and dried to afford 32.8 parts of a dark yellow indandione derivative of the following formula:

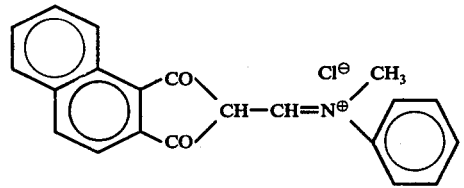

20.9 Parts of this compound was dispersed in 500 parts of N,N-dimethylacetamide, and 10 ml of a 28% by weight methanol solution of sodium methylate was added dropwise, whereupon the solution turned into a dark red solution. To this solution was added 3.0 parts of 2,6-diaminotoluene, and 1.0 part of glacial acetic acid was further added. The mixture was stirred at 120° C. for 2 hours, and filtered at 60° C. The filtration cake was washed with methanol and hot water in this order, and dried to afford 9.2 parts of a yellow pigment as a powder, which was found to have the following structure:

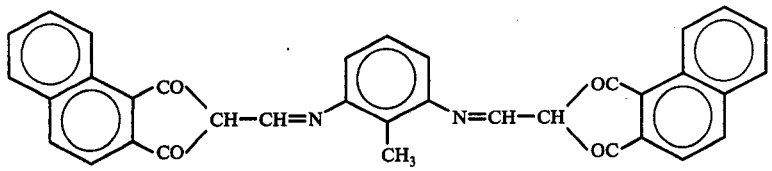

This pigment could color polystyrene brilliant yellow. A plate prepared from the colored polystyrene did not undergo discoloration even when exposed to a fadeometer for 100 hours.

EXAMPLES 8 TO 46

In the same way as in Example 1, various pigments of formula (I) in which $n$ is 2 and A and B are as indicated in Table 1 were prepared from the indandione derivatives and diamino compounds. The colors shown in Table 1 were those of printing inks prepared by using the pigments, which were formed upon extending on paper.

Table 1

| Examples | A | B | Colors |
|---|---|---|---|
| 8 | tetrachlorophenyl (Cl,Cl,Cl,Cl) | –phenyl– | Reddish yellow |
| 9 | " | –C₆H₃(CH₃)–C₆H₃(CH₃)– (3,3'-dimethylbiphenyl) | Yellowish orange |
| 10 | " | –C₆H₄–CH₂–C₆H₄– | Bluish yellow |
| 11 | " | –C₆H₄–NHCONH–C₆H₄– | Yellow |
| 12 | " | –C₆H₃(CH₃)(3-methyl)–N=N–C₆H₅ (with additional CH₃) | Brown |
| 13 | " | –(direct bond) | Orange |
| 14 | " | –C₆H₄–NHCO–C₆H₄–CONH–C₆H₄– | Bluish yellow |
| 15 | " | benzoxazole linker –C₆H₄–O–C(=N)–C₆H₄– | Yellow |
| 16 | " | –C₆H₃(CH₃)– (tolyl) | Orange |
| 17 | o-phenylene (dimethyl) | –C₆H₃(OCH₃)–NHCO–C₆H₄–CONH–C₆H₃(OCH₃)– | Reddish yellow |
| 18 | " | quinazoline-type: –C₆H₃(OH)–N=C(–C₆H₄–)–N– | Yellow |

Table 1-continued
| Examples | A | B | Colors |
|---|---|---|---|
| 19 | 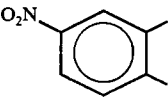 | 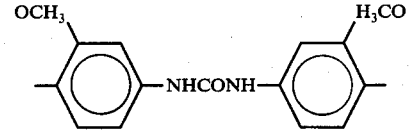 | Reddish yellow |
| 20 | " |  | Yellow |
| 21 | 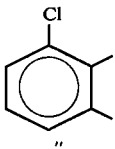 | 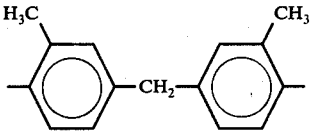 | Bluish yellow |
| 22 | " | 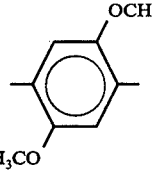 | Yellowish red |
| 23 | " | 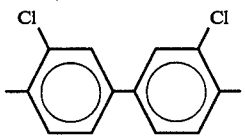 | Bluish yellow |
| 24 | 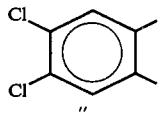 | 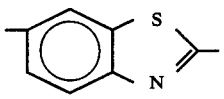 | Reddish yellow |
| 25 | " | 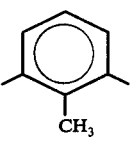 | Bluish yellow |
| 26 | 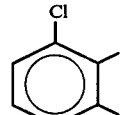 | 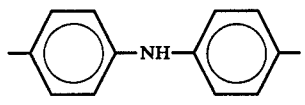 | Brown |
| 27 | 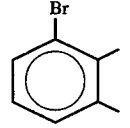 | 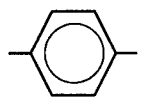 | Yellow |
| 28 | " | 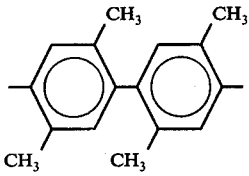 | Reddish yellow |
| 29 | 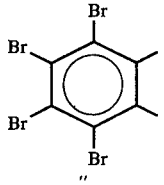 | 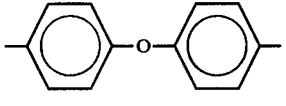 | Reddish yellow |
| 30 | " | 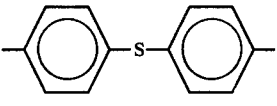 | Reddish yellow |

Table 1-continued
| Examples | A | B | Colors |
|---|---|---|---|
| 31 | 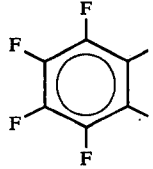 | 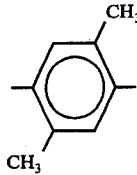 | Yellow |
| 32 | 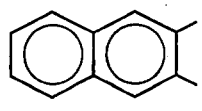 | 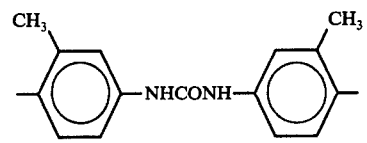 | Reddish yellow |
| 33 | 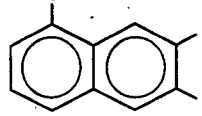 | 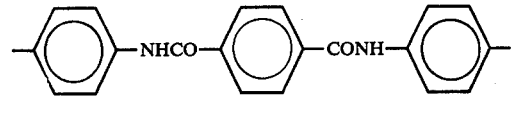 | Bluish yellow |
| 34 | 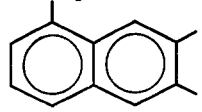 | 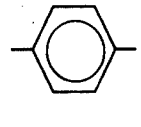 | Reddish yellow |
| 35 |  | 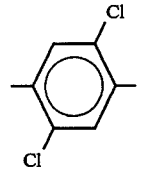 | Bluish yellow |
| 36 |  | 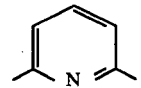 | Bluish yellow |
| 37 | " | 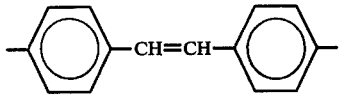 | Yellowish orange |
| 38 | " | 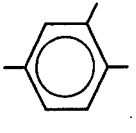 | Orange |
| 39 | " | 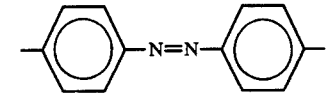 | Reddish orange |
| 40 |  | 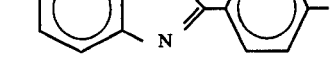 | Yellow |
| 41 | 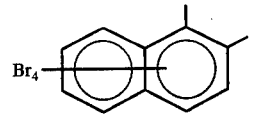 | 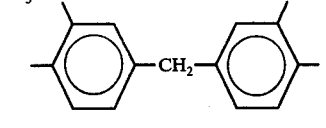 | Reddish yellow |
| 42 | 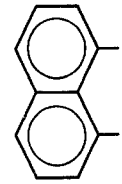 | 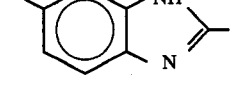 | Yellow |

Table 1-continued

| Examples | A | B | Colors |
|---|---|---|---|
| 43 | 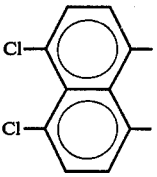 | 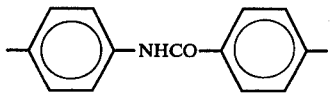 | Yellow |
| 44 | 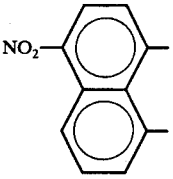 | 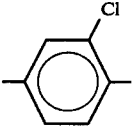 | Bluish yellow |
| 45 | 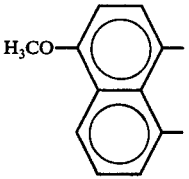 | 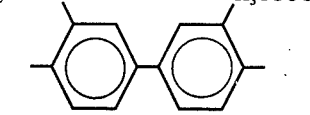 | Bluish yellow |
| 46 | 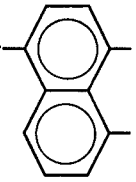 | 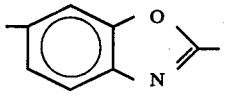 | Yellow |

EXAMPLE 47

31.3 Parts of 2-formyl-4,5,6,7-tetrachloroindandione-(1,3) and 29.0 parts of 3-amino-4-methoxybenzoyl-(2'-methyl-3'-chlorophenylamide) were each pulverized thoroughly, and then suspended in 2,000 parts of water, and stirred at 90° to 95° C. for 2 hours to afford a bluish yellow precipitate. The precipitate was collected by filtraction, and washed with hot water, and then dried to afford 54.0 parts of a bluish yellow pigment as a powder, which was found to have the following structure:

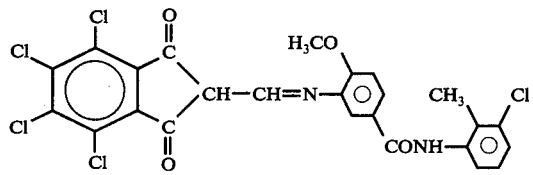

This pigment was kneaded with an aminoalkyd resin, and a thinner was added to form a paint. The paint was sprayed into a steel panel and baked to afford a bluish yellow coating. The coating was overcoated with a white paint of an aminoalkyd resin diluted with titanium white, and the overcoat was baked at 160° C. for 30 minutes. No bleeding was observed.

Furthermore, the above pigment was diluted with 20 times its weight of titanium white, and mixed with an aminoalkyd resin to form a light-colored aminoalkyd resin paint. The paint was sprayed onto a steel panel to form a light colored coating. When it was exposed to a Sunshine Weather-Ometer for 500 hours, the color did not change nor fade, and had good weatherability.

EXAMPLE 48

5.2 Parts of tetrabromo-5,6-benzoindandione-(1,3) and 2.8 parts of 4-methyl-benzoyl-(2',5'-dimethoxy-4'-aminophenylamide) were dissolved in 300 parts of N,N-dimethyl-formamide, and at room temperature, 1.8 parts of ethyl orthoformate was added dropwise. At the same temperature, the mixture was stirred for 30 minutes, and then at 120° C. for 3 hours. Then, it was hot-filtered, and the filtration cake was washed with methanol and hot water in this order, and dried to afford 5.6 parts of a brillant orange pigment as a powder, which was found to have the following structure:

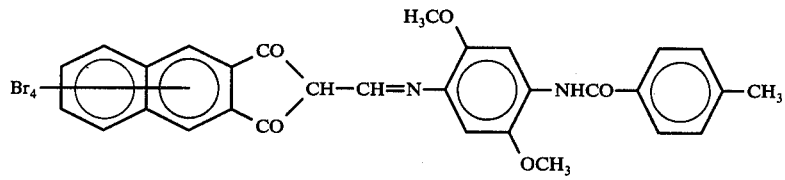

A dry color was prepared by mixing this pigment and zinc stearate in a mixing ratio of 1:4, and 0.5 part of the dry color was blended with 100 parts of polyethylene. The mixture was extruded at a molding temperature of 250° C. for a residence time of 5 minutes to form a plate colored brilliant deep orange. The color due of this plate was much the same as that of a plate obtained from the same material at a molding temperature of 200° C. This means that the pigment had good thermal stability. When this plate was exposed to a Sunshine Weather-Ometer for 500 hours, no discoloration was observed.

EXAMPLE 49

22.6 Parts of 4-methoxy-1,8-malonylnaphthalene was dissolved in 100 parts of N,N-dimethylformamide, and 15.8 parts of phosphorus oxychloride was added dropwise at 20 to 30° C. Then, the solution was heated to 60° C., and stirred at this temperature for 1 hour. It was then cooled, and poured into 1,000 parts of ice water. The precipitate formed was collected by filtration, washed with water, and dried to afford 18.5 parts of a bluish yellow powder. This product was an indandione derivative of the following formula:

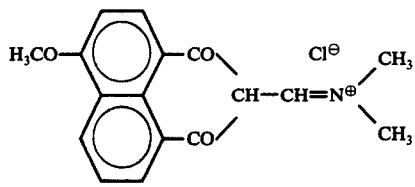

3.1 Parts of the resulting compound and 1.8 parts of 6-amino-2,4-quinazolindione were dispersed in 100 parts of trichlorobenzene, and 2.0 parts of a 28% by weight methanol solution of sodium methylate was added dropwise. The mixture was stirred for 30 minutes, and then heated to evaporate off methanol. The residue was stirred at 140° C. for 2 hours, and then filtered at 80° C. The filtration cake was washed with methanol and hot water in this order, and dried to afford 2.8 parts of a yellow pigment having fluorescence as a powder, which was found to have the following structure:

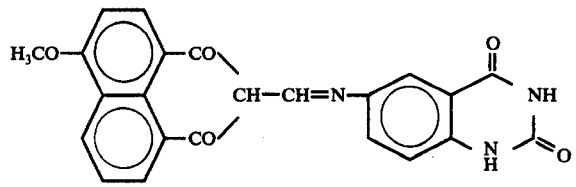

A printing ink obtained by kneading this pigment with a varnish had good printability, and gave a yellow print having brilliant fluorescence on paper. When the print was exposed to a fade-ometer for 200 hours, no discoloration was observed.

EXAMPLE 50

24.2 Parts of 2-formyl-4,7-dichloroindandione-(1,3) and 33.4 parts of 4-amino-4'-phthalimido-3,3'-dimethoxy diphenyl were stirred under reflux in 1,000 parts of 80% acetic acid for 2 hours. The solution was filtered at 60° C., and the filtration cake was washed with N,N-dimethylformamide, methanol and hot water in this order, and dried to afford 51.8 parts of a reddish orange pigment as a powder, which was found to have the following structure:

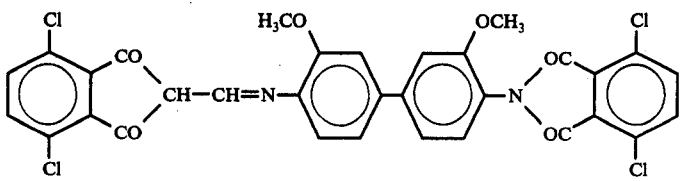

This pigment could color polyvinyl chloride brilliant reddish orange, and did not undergo discoloration even when kneaded by two rolls at 160° C. for 15 minutes.

When a white sheet colored with titanium white was superposed on a sheet colored with the indandione pigment obtained, and a migration test was performed by applying a pressure of 100 g/cm$^2$ to the assembly at 100° C. for 1 hour, no migration was observed. When the colored sheet was exposed to a fade-ometer for 200 hours, no discoloration was observed.

EXAMPLE 51

19.6 Parts of 4,5-benzoindandione-(1,3) was poured at 30° C. into 1,000 parts of ethyl acetate having dissolved therein 15.0 parts of methyl orthoformate, and the mixture was stirred at this temperature for 30 minutes. Then, 23.7 parts of 2-phenyl-6-amino-4-quinazoline was poured into the mixture. The mixture was stirred for 6 hours under reflux, and hot-filtered. The filtration cake was washed with methanol and hot water in this order, and dried to afford 35.7 parts of a bluish yellow pigment as a powder, which was found to have the following structure:

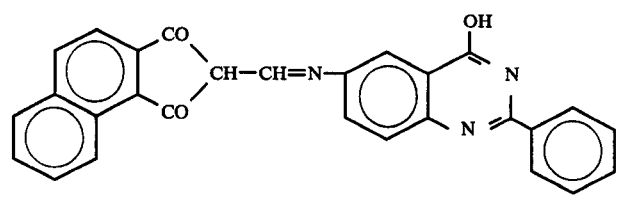

A plate was prepared from polystyrene colored brillant bluish yellow by this pigment. When it was exposed to a fade-ometer for 200 hours, no discoloration was observed.

EXAMPLE 52

4.7 Parts of 2-formyl-4,5,6,7-tetrabromoindandione-(1,3) and 2.5 parts of 2,5-dimethyl-4-N-phenyl-carbamoylaminoaniline were added to 200 parts of isopropanol, and stirred under reflux for 4 hours. The solution was hot-filtered. The filtration cake was washed with isopropanol and hot water in this order, and dried to afford 6.0 parts of a reddish yellow pigment as a powder, which was found to have the following structure:

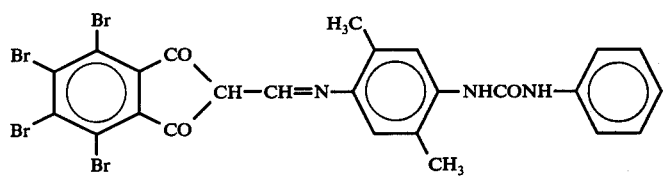

The pigment obtained was kneaded with a melamine alkyd resin, and a thinner was added. The resulting paint was sprayed onto a steel panel, and baked to afford a brilliant reddish yellow coating. A bleeding test was performed using the coated plate, and it was found that no bleed was caused. When this coated plate was exposed to a Sunshine Weather-Ometer for 1,000 hours, no discoloration was observed. It was confirmed therefore that this pigment had good light fastness.

EXAMPLES 53 to 83

Various pigments of formula (I) in which $n$ is 1 and A and B are as shown in Table 2 were prepared from the indandione derivatives and monoamino compounds by the same method as in Example 52. The colors shown in the table were those of printing inks prepared by using the pigments, which were formed upon extending on paper.

Table 2

| Examples | A | B | Colors |
|---|---|---|---|
| 53 | Cl, Cl, Cl, Cl (tetrachloro) | H₃C, CH₃, NHCOCH₃ substituted phenyl | Bluish yellow |
| 54 | " | H₃CO, CH₃, NHCO-(2,4-dichlorophenyl) substituted phenyl | Bluish yellow |
| 55 | " | H₃CO, SO₂NH-(2-methyl-4-methylphenyl) substituted phenyl | Bluish yellow |
| 56 | " | H₃CO, benzimidazolone substituted phenyl | Orange |
| 57 | " | carbazole (NH) | Yellow |
| 58 | " | 2,5-dimethoxyphenyl-NHCO-phenyl-NHCO-phenyl | Orange |

Table 2-continued
| Examples | A | B | Colors |
|---|---|---|---|
| 59 | 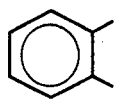 | 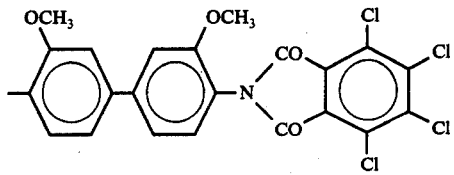 | Yellow |
| 60 | " | 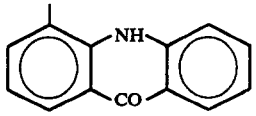 | Yellow |
| 61 | 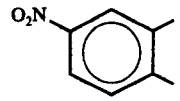 | 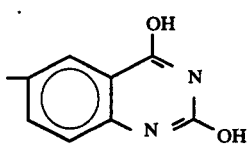 | Bluish yellow |
| 62 | " | 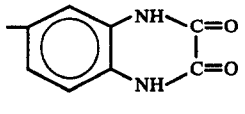 | Bluish yellow |
| 63 | 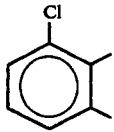 | 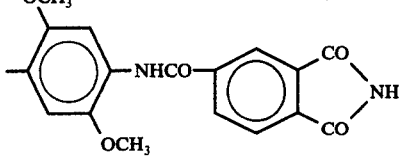 | Reddish yellow |
| 64 | 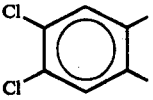 | 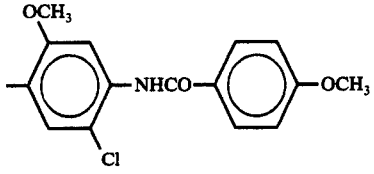 | Bluish yellow |
| 65 | 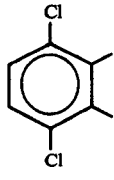 | 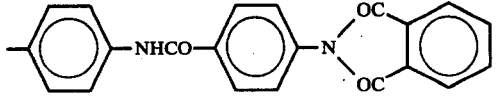 | Bluish yellow |
| 66 | " | 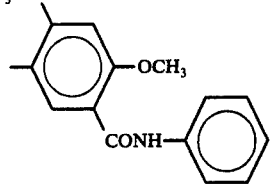 | Reddish yellow |
| 67 | " | 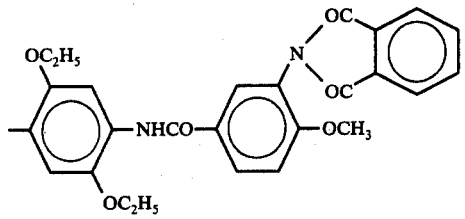 | Yellowish orange |

Table 2-continued

| Examples | A | B | Colors |
|---|---|---|---|
| 68 | 2-bromotoluene | 6-methoxy-4-methyl-3,4-dihydroquinolin-2(1H)-one | Reddish yellow |
| 69 | 1,2,4-tribromobenzene | benzoxazol-2(3H)-one | Yellow |
| 70 | 1,2,3,4-tetrabromobenzene | N-(2,4-dimethoxyphenyl)benzamide | Reddish yellow |
| 71 | " | N-(2,4-dimethylphenyl)-3,4-dimethylbenzamide | Bluish yellow |
| 72 | pentafluorobenzene | N,N-(tetrachlorophthaloyl)-3,3',4-trimethyl-4'-aminobiphenyl | Yellow |
| 73 | 2,3-dimethylnaphthalene | N-(2-oxo-2,3-dihydro-1H-benzimidazol-5-yl)-4-methoxybenzamide | Bluish yellow |
| 74 | 1-chloronaphthalene | N-(2,6-dimethoxy-4-methylphenyl)-4-chlorobenzamide | Bluish yellow |
| 75 | 1-nitronaphthalene | benzothiazol-2(3H)-one | Yellow |
| 76 | dibromonaphthalene | N-(3,4-dichlorophenyl)-N'-(3-methoxyphenyl)urea | Bluish yellow |

Table 2-continued

| Examples | A | B | Colors |
|---|---|---|---|
| 77 | Br₄-[naphthalene] | H₃CO-[benzene(CH₃,OCH₃)]-NHCO-[benzene(Cl,Cl)] | Yellowish orange |
| 78 | [naphthalene(CH₃,CH₃)] | [benzene(CH₃,CH₃)]-NHCO-[benzene]-CO-NH-CO | Yellow |
| 79 | [naphthalene] | H₃C-[benzene(CH₃)]-NHCO-[benzene-Cl] | Bluish orange |
| 80 | Cl-[naphthalene] | OC₂H₅-[benzene(H₅C₂O)]-NHCO-[benzene] | Reddish yellow |
| 81 | Cl,Cl-[naphthalene] | [benzene]-C(OH)=CH-C(CH₃)=N- (quinoline-type) | Bluish yellow |
| 82 | Br-[naphthalene] | [benzene]-C(OH)=N-N=C(CH₃)- | Bluish yellow |
| 83 | NO₂-[naphthalene] | [benzene(CH₃)]-CO-[benzene]-NH- (phenoxazine-type) | Yellow |

What we claim is:
1. An indandione pigment of the formula

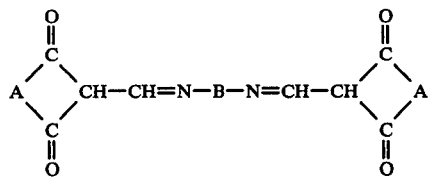

wherein

A is a phenylene or naphthylene group and

B is a phenylene group or the group

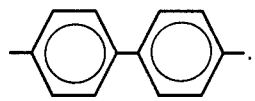

2. An indandione pigment of claim 1 wherein A is a phenylene group substituted by a halogen atom, a lower alkyl group, a lower alkoxy group or a nitro group.

3. An indandione pigment of claim 1 wherein A is a naphthylene group substituted by a halogen atom, a lower alkyl group, a lower alkoxy group or a nitro group.

4. An indandione pigment of claim 1 wherein B is a phenylene group substituted by a lower alkyl group, a lower alkoxy group, a halogen atom, an acetylamino group or a benzoylamino group.

5. An indandione pigment of claim 1 wherein B is the group

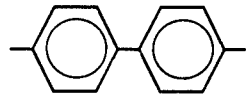

which is substituted by a lower alkyl group, a lower alkoxycarbonyl group or a halogen atom.

* * * * *